United States Patent [19]
Hahne et al.

[11] Patent Number: 5,115,430
[45] Date of Patent: May 19, 1992

[54] FAIR ACCESS OF MULTI-PRIORITY TRAFFIC TO DISTRIBUTED-QUEUE DUAL-BUS NETWORKS

[75] Inventors: Ellen L. Hahne, Westfield; Nicholas F. Maxemchuk, Mountainside, both of N.J.

[73] Assignee: AT&T Bell Laboratories, Murray Hill, N.J.

[21] Appl. No.: 586,661

[22] Filed: Sep. 24, 1990

[51] Int. Cl.⁵ .............................................. H04J 3/02
[52] U.S. Cl. ................................ 370/85.6; 370/85.11
[58] Field of Search ................. 370/85.6, 85.3, 85.4, 370/85.5, 85.9, 85.11; 340/825.51, 825.5

[56] References Cited

U.S. PATENT DOCUMENTS 4,977,557 12/1990 Phung et al. ..................... 370/85.4
5,001,707 3/1991 Kositpaiboon et al. ........... 370/85.6

OTHER PUBLICATIONS

"Access Protection for Fairness in a Distributed Queue Dual Bus Metropolitan Area Network", J. Filipiak, 1989 IEEE, pp. 0635-0639.
"The QPSX Man", M. Newman, Z. L. Budrikis and J. L. Hullett, IEEE Communications Magazine, vol. 26, No. 4, Apr. 1988, pp. 20-28.
"The p_i Persistent Protocol for Unidirectional Broadcast Bus Networks", B. Mukherjee and J. S. Meditch, IEEE Transactions on Communications, vol. 36, No. 12, Dec. 1988, pp. 1277-1286.
"Bottleneck Flow Control", Jeffrey M. Jaffee, IEEE Transactions on Communications, vol. COM-29, No. 7, Jul. 1981, pp. 954-962.
"A Fair MAC Access Scheme":, M. A. Rodrigues, Document Number 802.6-88/62, Contribution to the IEEE 802.6 Working Group.
"A Non-Unity Ratio Bandwidth Allocation Mechanism—A Simple Improvement to the Bandwidth Balancing Mechanism", M. Spratt, Nov. 3, 1989, Contribution to the IEEE 802.6 Working Group.

*Primary Examiner*—Douglas W. Olms
*Assistant Examiner*—Wellington Chin
*Attorney, Agent, or Firm*—Henry T. Brendzel

[57] ABSTRACT

Bandwidth balancing is accomplished to DQDB networks that handle multi-priority traffic by causing each node to throttle its own rate of transmission in accordance with the priority of the data that the node transmits. In accordance with one approach, each node limits its throughput to the product of a bandwidth balancing factor (which is a fraction that varies according to the priority level of data) and the unused bus capacity. When parcels of different priorities are received within each node, the parcels are processed in priority order. In accordance with another approach, all active parcels within a node are handled concurrently and receive some bandwidth. The throughput of each parcel in a node is limited to the product of the bandwidth balancing factor and the unused bus capacity. In accordance with still another approach, each traffic parcel limits it throughput to the product of the bandwidth balancing and the bus capacity unused by parcels of equal or higher priority. This scheme allocates bandwidth first to the higher-priority parcels, then allocates the leftovers to the lower-priority parcels. Lower-priority parcels have no effect on the steady-state throughputs of higher-priority parcels.

25 Claims, 3 Drawing Sheets

FAIR ACCESS OF MULTI-PRIORITY TRAFFIC TO DISTRIBUTED-QUEUE DUAL-BUS NETWORKS

BACKGROUND OF THE INVENTION

This relates to communication systems and, more particularly, to protocols for fair allocation of transmission resources in a communications system.

The Distributed-Queue Dual-Bus (DQDB) is a communication network with a slotted access protocol that is currently being standardized by the IEEE 802.6 Working Group. As the transmission rates and distances spanned by networks increase, slotted networks can be much more efficient than token-passing networks. However, in slotted networks, the grade of service provided to nodes can depend on their relative position. The combination of the network span, transmission rate, and slot size of DQDB allow many slots to be in transit between the nodes. On a long network, if the access protocol is too efficient and tries to never waste a slot, then users can receive very unfair service, especially during large file transfers. Moreover, if the file transfers are of different priority, then the priority mechanism can be completely ineffective.

In an invention disclosed in U.S. Pat. applications Ser. No. 07/387247, filed Jul. 28, 1989, we describe a number of techniques for explicit bandwidth balancing. Our disclosed bandwidth balancing intentionally wastes a small amount of bus bandwidth in order to facilitate coordination among the nodes currently using that bus, but it divides the remaining bandwidth equally among those nodes. The key idea is that the maximum permissible nodal throughput rate is proportional to the unused bus capacity; and that each node can determine this unused capacity by locally observing the volume of busy slots and reservations. The system achieves fairness gradually, over an interval several times longer than the propagation delay between competing nodes.

This bandwidth balancing, which was incorporated as a DQDB protocol option into the IEEE 802.6 draft standard, guarantees equal allocations of bus bandwidth to nodes with heavy demand at the lowest priority level. It turns out that a node with higher-priority traffic is guaranteed at least as much bandwidth as a lowest-priority node, but no further guarantees are possible. As long as the higher-priority applications do not require more bandwidth than the lowest-priority applications, this performance guarantee is sufficient. However, if priorities are to be assigned to applications with significant volume, such as packet video and bridging of high-speed local area networks, then improvements may be desirable.

It is difficult to make priorities work effectively over long DQDB networks with the current control information. The reason for this lies in the fact that while the priority level of a reservation is known, the priority level of the data in a busy slot is not known. (The priority level is typically designated with a priority designating field associated with each reservation.)

It is an object of this invention to make the network fairer in an environment which supports traffic of multiple priority levels, and at least account for the different priorities of packets in the allocation of bus bandwidth.

SUMMARY OF THE INVENTION

In accordance with the principles of this invention, bandwidth balancing is accomplished in DQDB networks that handle multi-priority traffic by causing each node to throttle its own rate of transmission in accordance with the priority of the data that the node transmits. All of the disclosed approaches rely on wasting a fraction of the available bandwidth in order to insure fairness.

In accordance with one approach, each node limits its throughput to the product of some fraction and the unused bus capacity. The bandwidth balancing factor varies according to the priority level at which the node is currently transmitting. Within each node, when parcels of different priorities are received, the node processes its parcels in strict priority order; lower-priority parcels are only served when no higher-priority parcels are waiting. Thus, this scheme allocates bandwidth to all nodes in proportion to the bandwidth balancing factors of their current (highest) priority levels. This first approach is called "local per-node"—"local" because the node only needs to know the priority of its own locally-generated data, and "per-node" because individual nodes are the entities that are treated fairly.

In accordance with another approach, all active parcels within a node receive some bandwidth. The throughput of each parcel is limited to the product of the bandwidth balancing factor (which depends on the priority level of the parcel) and the unused bus capacity. Thus, this scheme allocates bandwidth to all parcels, regardless of which nodes they belong to, in proportion to their bandwidth balancing factors. This is called the "local per-parcel" approach.

In accordance with still another approach, each traffic parcel limits its throughput to the product of the bandwidth balancing factor and the bus capacity that is unused by parcels of equal or higher priority. Thus, this scheme allocates bandwidth first to the higher-priority parcels, then allocates the leftovers to the lower-priority parcels. Lower-priority parcels have no effect on the steady-state throughputs of higher-priority parcels. This is called the "global per-parcel" approach—"global" because each node needs to know the priority of the data generated by all the other nodes.

DETAILED DESCRIPTION

Figure 1:
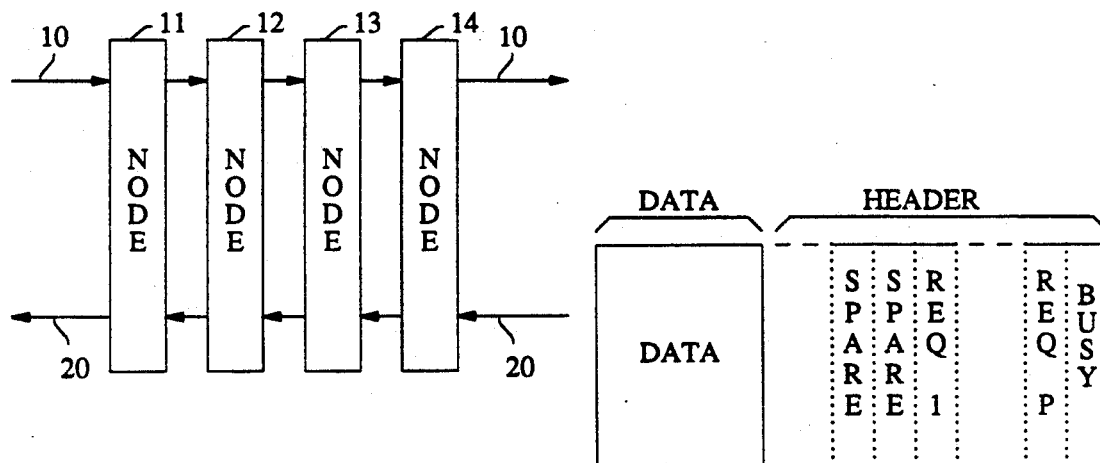
FIG. 1 presents a section of a DQDB network and illustrates one of the time slots appearing in the two buses of the FIG. 1 network.

The significant difference between the DQDB protocol and previous slotted access protocols is the use of each bus to reserve slots on the other bus in order to make the access fairer. FIG. 1 depicts a section of a DQDB network, with nodes 11, 12, 13 and 14, and buses 10 and 20 passing through the nodes. Each node is capable of sending traffic to "downstream" nodes, and receive traffic from "upstream" nodes. The traffic is in the form of slot 15 and each slot contains a header field and a data field. The current proposal for the header field includes a single busy bit, two bits that can be used to designate the priority of the data in the busy slot, and a request bit field containing one request bit for each priority level. The request bits on one bus are used to notify nodes with prior access to the data slots on the other bus that a node is waiting. When a node wants to transmit a data segment on a bus, it sets a request bit on the opposite bus and waits for an empty slot on the desired bus. The busy bit indicates whether another node (upstream) has already inserted a segment of data into the slot.

The operation for data transmission in both directions is identical. Therefore, for the remainder of this disclosure operation in only one direction is described. More specifically, henceforth, bus 10 is the data bus and bus 20 is the reservations bus.

A brief review of the bandwidth balancing approach which was disclosed in the aforementioned application and adopted by the IEEE 802.6 Working Group may be appropriate.

It may be noted at this point that in the previously disclosed bandwidth balancing approach it is the nodes that receive "fair treatment". However, when nodes have traffic of different priority levels, perhaps a different fundamental "fair treatment" entity should be considered—such as parcels, where a parcel is traffic originating at a node at a particular priority level, for transmission over the data bus.

In what follows, it is assumed that the traffic demand of each node n has some fixed rate $\rho(n)$. This offered load can be stochastic, as long as it has a well-defined average rate. The offered load of the traffic parcel of priority level p at node n is $\rho_p(n)$. The actual long-term average throughput of node n is $r(n)$, and that of its parcel p is $r_p(n)$. The unused bus capacity is U.

Employing the above nomenclature in the previously disclosed bandwidth balancing approach, the unused bus capacity on bus 10 is $$U = 1 - \sum_{m=1}^{N} r(m) \tag{1}$$

where N is the total number of nodes in the network.

Of course, any individual node n, at any instant t, does not have direct knowledge of the long-term average rates defined above. All the node can see is the rate of busy slots coming into node n at time t from nodes upstream (designated B(n,t)), the rate of requests coming into node n at time t from nodes downstream (designated R(n,t)), and the rate at which node n serves its own data segments at time t (designated S(n,t)). These observations can be used to determine the bus capacity that is unallocated by node n at time t, i.e., U(n,t).

$$U(n,t) = 1 - B(n,t) - S(n,t). \tag{2}$$

The "unallocated" capacity is the capacity that is neither used by nodes upstream of n, nor requested by nodes downstream of n, nor taken by node n itself.

For traffic with no priority designations (or uni-priority), bandwidth balancing achieves fairness by guaranteeing that there is some unused bus capacity, and asking each node to limit its throughput to some multiple F (bandwidth balancing factor) of that unused capacity. Nodes with less demand than this can have all the bandwidth they desire. Thus, the average throughput of a node n, with bandwidth balancing, is $$r(n) = \min[\rho(n), F \cdot U] = \min\left[\rho(n), F \cdot \left(1 - \sum_m r(m)\right)\right]. \tag{3}$$

The approach reflected by equation 3 is fair in the sense that all rate-controlled nodes get the same bandwidth. Equivalently, equation 3 may be written as $$\frac{r(n)}{F} = \min\left[\frac{\rho(n)}{F}, U\right]. \tag{4}$$

Equation 3 represents a set of almost linear equations (one for each node) in the unknowns r(n). In the special case where all N nodes have heavy demand ($\rho(n)$ is large), the solution of these equations has a simple form of $$r(n) = \frac{F}{1 + F \cdot N}. \tag{5}$$

That is, all N nodes have the same throughput, with a value specified by equation 5. That means that if F=4 and there are three nodes with heavy demand, then each node gets 4/13 of the bus capacity, and 1/13 of the bus capacity goes unused. The total bus utilization (which in the case of equation 5 is $F \cdot N/1 + F \cdot N$) increases as N and/or F increase.

In order to implement the above-described uni-priority bandwidth balancing, the slot header need only contain the busy bit and a single request bit. A node can determine the bus utilization by summing the rate of busy bits on bus 10, the rate of requests on bus 20, and the node's own transmission rate. In the long run, this sum should be the same at every node (though the individual components will differ from node to node). In other words, each node has enough information available to implement equation 3.

Fortunately, it is not necessary for the node to explicitly measure the bus utilization rate over some lengthy interval. Rather, it is sufficient for node n to respond to arriving busy bits and request bits in such a way that the rate at which it serves its own data is less than or equal to F times the unallocated capacity. That is, $$S(n,t) \leq F \cdot U(n,t) \tag{6}$$

or, $$U(n,t) \geq \frac{S(n,t)}{F}. \tag{7}$$

At steady state, S(n,t) of equations 6 and 7 will approach r(n) of equation 3.

Figure 2:
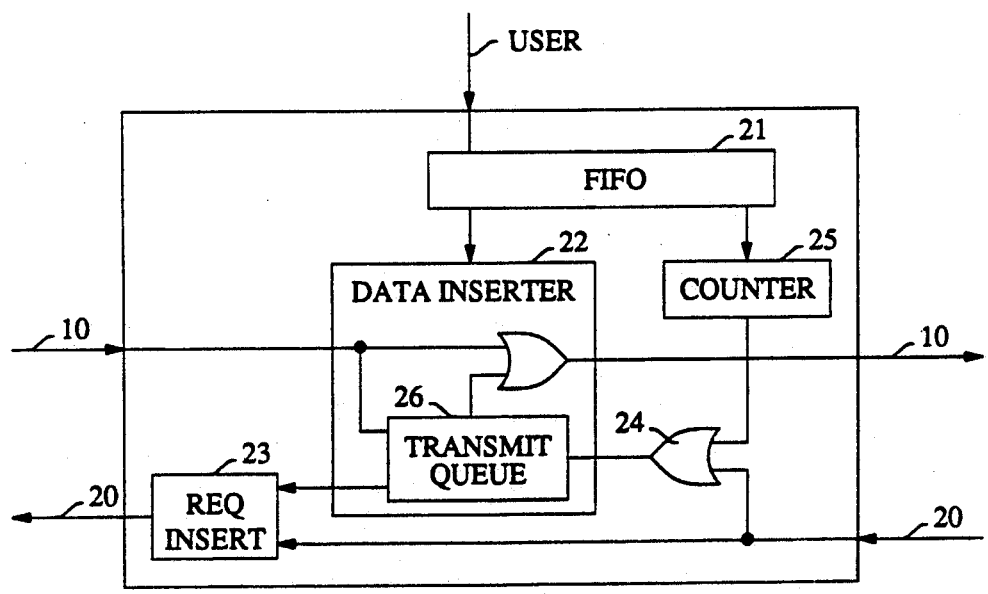
FIG. 2 depicts one embodiment of a bandwidth balancing node that may be used for uni-priority operation.

There are several ways to implement expressions 6 and 7. FIG. 2, for example, depicts one implementation for carrying out bandwidth balancing in accordance with expression 6. It includes a local FIFO memory 21, data inserter 22, a request inserter 23, OR gate 24 and segment counter 25. Data inserter 22 straddles bus 10. It receives signals from nodes upstream from itself and sends signals to nodes downstream from itself (when referring to signals on buses 10 and 20, the terms "upstream" and "downstream" always refer to nodes that are "upstream" and "downstream" vis-a-vis the bus under discussion). Data inserter 22 is also responsive to local FIFO 21 and is connected to bus 20 via request inserter 23 and OR gate 24. Request inserter 23 straddles bus 20 or, more specifically, request inserter 23 receives one input from bus 20 upstream of itself and delivers an output on bus 20 to downstream nodes. Another input to request inserter 23 comes from data inserter 22. OR gate 24 is also responsive to bus 20 and it delivers its output to data inserter 22. Counter 25 supplies signals to OR gate 24 in response to data derived from FIFO 21.

The function of FIFO 21 is to store data segments generated by local users while these segments wait for data inserter 22 to find appropriate empty slots on data bus 10. Data inserter 22 operates on one local data segment at a time; once FIFO 21 forwards a segment to data inserter 22, it may not forward another segment until the inserter has written the current segment onto data bus 10. When data inserter 22 takes a segment from FIFO 21, it orders request inserter 23 to send a request on the request bus (20), and proceeds to determine the appropriate empty slot for the local segment. This determination is accomplished by inserting the segment into the data inserter's transmit queue 26. All the other elements of this queue are requests from downstream nodes that were received by data inserter 22 from bus 20 via OR gate 24. Some of the requests in the Transmit Queue arrived *before* the local data segment and are queued *ahead* of it, but others arrived *later* and are queued *behind* it. Data inserter 22 serves its transmit queue 26 whenever an empty slot comes by on data bus 10. When the entry at the head of transmit queue 26 is a request from a downstream node, data inserter 22 lets the empty slot pass. When the head entry is the local data segment, then the busy bit is set and the segment is applied to, and transmitted in, that slot.

Transmit queue 26 can be implemented with a one-bit register and two counters. The one bit register indicates whether there is a local data segment in the queue, and the two counters indicate the number of requests that arrived on bus 20 before and after the arrival of the local data segment at the data inserter.

The circuitry that actually accounts for the bandwidth balancing factor, F, is implemented in the FIG. 2 embodiment through segment counter 25. Counter 25 counts data segments as they are taken from FIFO 21 by data inserter 22. After F data segments have been counted, counter 25 resets itself to zero and generates a signal for OR gate 24. The data inserter receives that signal, via OR gate 24, as if it were a request from an upstream (vis-a-vis bus 20) node. This artificial, local, request causes data inserter 22 to let a slot go unallocated, and that carries out the bandwidth balancing function.

With multi-priority traffic the situation is different, of course. However, in accordance with the principles of our invention, F can still be used effectively to balance the transmission resource of the network. Specifically, in situations where different nodes in a DQDB network offer traffic at different priorities, bandwidth balancing is accomplished by allowing the bandwidth balancing factor, F, to assume a different value at each of the nodes, in accordance with the priority level of the node's traffic. That is, a number of different bandwidth balancing factors, $F_1, \ldots F_p, \ldots F_P$, are used, where $F_1$ is the bandwidth balancing factor for priority-1 traffic (lowest priority), $F_P$ is a different bandwidth balancing factor for priority-P traffic (highest priority) and $F_p$ is an "in between" bandwidth balancing factor for "in between" priority-p traffic. When each node is allowed to transmit data of traffic at its selected priority level, the unused capacity is $$U = 1 - \sum_{m=1}^{M} \sum_{q=1}^{P} r_q(m) \quad (8)$$

and the throughput that a node which carries traffic of priority-p can reach is limited to $F_p$ times the unallocated capacity. Thus, $$r_p(n) = \min[p_p(n), F_p \cdot U] = \quad (9)$$

$$\min\left[ p_p(n), F_p \cdot \left( 1 - \sum_m \sum_q r_q(m) \right) \right].$$

Equivalently, equation 11 can be written as $$\frac{r_p(n)}{F_p} = \min\left[ \frac{p_p(n)}{F_p}, U \right]. \quad (10)$$

This scheme is fair in the sense that all nodes active at the same priority level get the same bandwidth. Nodes transmitting at different priorities get bandwidth in proportion to the bandwidth balancing factors of their priority levels. This takes care of providing a greater capacity to nodes that carry a higher priority traffic. As an aside, one may assume for convenience that the bandwidth balancing factors $F_i$ ($1 \leq i \leq P$) are integers, but actually rational numbers can also be used. It may be highlighted at this point that each node is totally oblivious to priority levels of the busy slots and to the priority levels of the reservation fields (even though information about the latter can be easily obtained with the slot structure of FIG. 1). Each node is only aware of the priority level of its own data, and it throttles itself only in accordance with that information.

The above addresses the situation where every node in the network has only one parcel that it wishes to transmit at any one time. A question immediately arises, of course, as to what happens when a node has traffic of multiple priority levels. That is, the situation may be that each node has, or at least is allowed to have a number of parcels. Two approaches can be applied to insure a fair allocation of bandwidth. One is somewhat akin to time division multiplexing, while the other is more akin to space division multiplexing.

In the "time division" approach, each node orders its parcels according to their priority levels, and it offers the parcels to the network in order. So, with this approach, at any one time each node offers only one parcel and within each node the highest-priority parcel P (from among the parcels in the node) has preferred access. As far as the network is concerned, the operation follows equation 10. If the parcel of the highest priority presents a sufficient demand (i.e. a lot of data needs to be transmitted), then the node's throughput will match its entitlement for the highest priority parcel. In this case, however, the lower-priority parcels at the node will get nothing. On the other hand, when the traffic load of the highest priority parcel is less than the node's allocation, then the highest priority parcel gets all the bandwidth it desires, and the parcel(s) with the lower priorities in node n will use some of the leftover capacity. With two parcels (priority P and P−1), for example, their use will be bounded by the appropriately weighted average of their two throughput limits:

$$\frac{r_{P-1}(n)}{F_{P-1}} + \frac{r_P(n)}{F_P} = \min\left[\frac{\rho_{P-1}(n)}{F_{P-1}} + \frac{\rho_P(n)}{F_P}, U\right]. \quad (11)$$

In this manner, the throughputs of the various traffic parcels are determined sequentially, from priority P through 1. The formula for $r_p(n)$ is:

$$\sum_{q \geq p} \frac{r_q(n)}{F_q} = \min\left[\sum_{q \geq p} \frac{\rho_q(n)}{F_q}, U\right] \quad (12)$$

If U is expressed in terms of the parcel throughputs $r_p(n)$, then equation 12 represents a set of almost linear equations (one for each node and priority level) in the unknowns $r_p(n)$. In the special case where each node has heavy demand in its highest priority parcel ($\rho_q(n)$ is "out of the picture" in equation 12) and there are $N_p$ nodes active at priority level p, then the solution of these equations has a simple form:

$$r_p(n) = \frac{F_p}{1 + \sum_{q=1}^{p} F_q \cdot N_q}. \quad (13)$$

That means that, for example, if there are three priority levels, if $F_3=8$, $F_2=4$, and $F_1=2$, and if there is one node with heavy demand at each priority level, then the nodal throughput rates are 8/15, 4/15, and 2/15, and the unused bandwidth is 1/15 of the bus capacity.

The above-described "time division" approach of bandwidth balancing, which is basically a "local, per node" approach, requires the slot header to only contain the busy bit and a single request bit. As already mentioned earlier, the priority levels of the reservation or busy indications on buses 10 and 20 are not important. In order to implement equation 13, the node should respond to arriving busy bits and request bits in such a way that $$U(n,t) \geq \sum_q \frac{S_q(n,t)}{F_q}. \quad (14)$$

Figure 3:
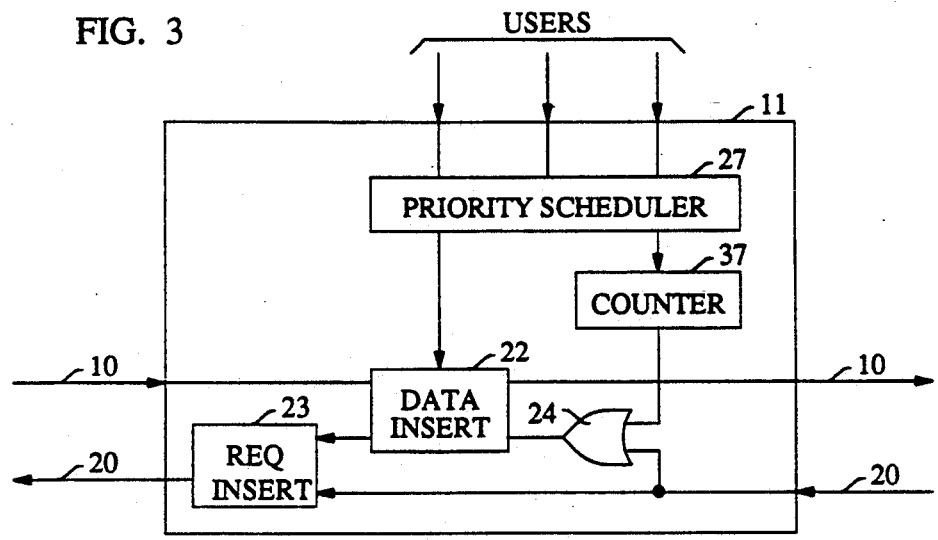
FIG. 3 illustrates one embodiment for a multi-priority node where parcels are injected into the network in priority order.

The embodiment of FIG. 3 illustrates one approach for carrying out this bandwidth balancing approach. As shown in FIG. 3, the depicted node is very similar to the embodiment of FIG. 2. It differs from the FIG. 2 embodiment in that instead of FIFO 21, FIG. 3 employs a priority scheduler 27. Scheduler 27 serves the same function as FIFO 21 except that it also orders the parcels arriving from the user, or users, according to priority so that parcels of high priority have absolute preference lower priority parcels. Counter 37 must account for these priority variations as well as effect the bandwidth balancing factor's function. One approach is to merely have different thresholds for the counter. Alternatively, a fixed threshold can be employed in counter 37 but the counting can be done in steps of varying sizes. For example, if F is 16 for the highest priority, 8 for the next priority level, and 4 for the lowest priority level, one can employ a counter 37 with a threshold set at 16 and count in steps of 1 for the high priority traffic, steps of 2 for the middle priority traffic, and steps of 4 for the low priority traffic. As before, when counter 37 reaches its threshold, a signal is sent to data inserter 22 (via OR gate 24) to simulate a "request".

When treating the various traffic parcels at a node as though they came from separate nodes (the "space division" approach), a different mode of operation results. In such an arrangement, the parcel of priority p is asked to limit its throughput to a multiple $F_p$ of the spare bus capacity; parcels with less demand than this can have all the bandwidth they desire. In such an arrangement, the resulting throughput of a parcel is $$r_p(n) = \min[\rho_p(n), F_p \cdot U] = \quad (15)$$

$$\min\left[\rho_p(n), F_p \cdot \left(1 - \sum_m \sum_q r_q(m)\right)\right],$$

or equivalently, $$\frac{r_p(n)}{F_p} = \min\left[\frac{\rho_p(n)}{F_p}, U\right]. \quad (16)$$

This scheme is fair in the sense that all rate-controlled parcels of the same priority level get the same bandwidth. Parcels of different priority levels are offered bandwidth in proportion to their bandwidth balancing factors $F_p$.

As in connection with previous expressions, it may be noted that expression 15 represents a set of almost linear equations (one for each node and priority level) in the unknowns $r_p(n)$. In the special case where all $N_p$ parcels of priority level p have heavy demand, the solution of these equations has the simple form of equation 13. Thus, for example, when there are three priority levels and $F_3=8$, $F_2=4$, and $F_1=2$, if there are one high-priority parcel, two medium-priority parcels, and one low-priority parcel, then the parcels' throughput rates are 8/19, 4/19, 4/19, and 2/19, and the unused bandwidth is 1/19 of the bus capacity. Note that the concept of "nodes" is essentially lost with this approach.

To implement this "space division" version of bandwidth balancing, which is a "local, per parcel" approach, the slot header need only contain the busy bit and a single request bit (i.e. again, there is no need for priority level information). In order to implement equation 15, the section of each node that handles priority p traffic should respond to arriving busy bits and request bits in such a way that $$S_p(n,t) \leq F_p \cdot U(n,t). \quad (17)$$

Figure 4:
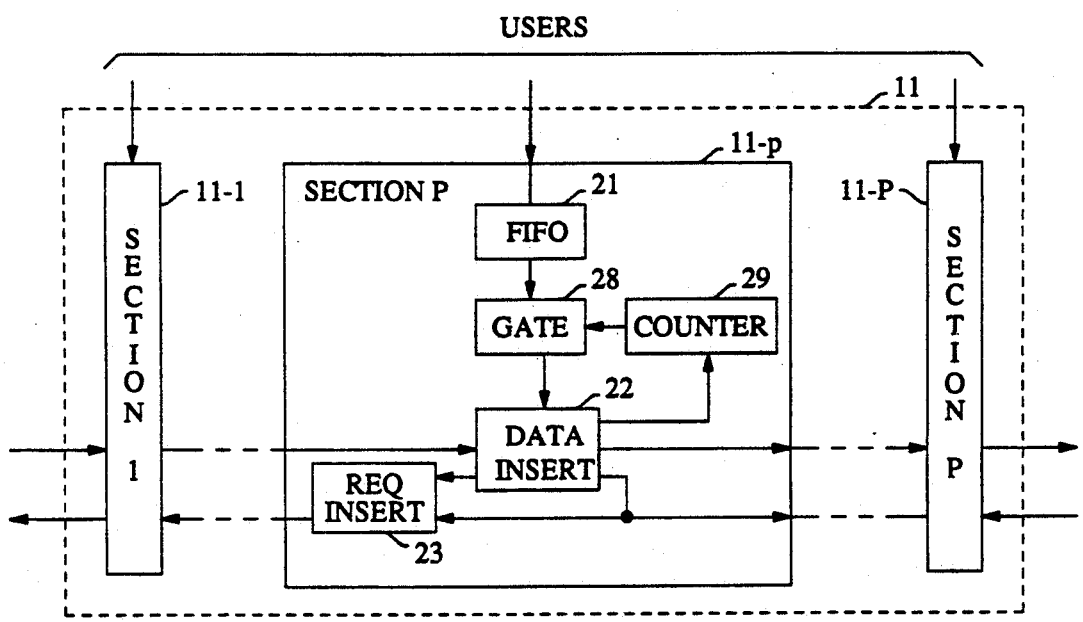
FIG. 4 is a block diagram of a multi-priority node that handles all parcels concurrently.

In the straightforward implementation of equation 17 shown in FIG. 4, the node has a separate section to manage data for each priority level. Depicted are sections 11-1, 11-p and 11-P which take care of priority-1, priority-p and priority-P parcels. P is the highest priority level and p is greater than 1 and less than P. Each section has its own data inserter 22, request inserter 23, local FIFO 21, gate 28, and permit counter 29. Inequality 17 is implemented by the node section of priority p as follows. Whenever data inserter 22 observes an unallocated slot (a slot that is neither busy nor reserved for a downstream node nor used to transmit a local data segment of priority p), it creates $F_p$ permits by incrementing its permit counter 29 by the bandwidth balancing factor $F_p$. Gate 28 prevents FIFO 21 segments from reaching data inserter 22 unless counter 29 is positive. While counter 29 is positive, data inserter 22 takes a segment from FIFO 21 and inserts it into its transmit queue 26 (not shown in FIG. 4 but shown in FIG. 2). Within the transmit queue, the requests received from bus 20 are ordered according to their time of arrival, as described before. With each appearance of a non-busy slot, data inserter 22 allows the non-busy slot to pass unpopulated as long as transmit queue 26 is serving requests from downstream nodes. When the segment taken from FIFO 21 reaches the top of the transmit queue, data inserter 22 inserts the segment into the non-busy slot, marks the slot busy, and decrements counter 29 by 1. Counter 29 is reset to zero whenever there are no more segments in FIFO 21. When counter 29 is at zero, either because there are no more segments in FIFO 21 or because F number of segments were inserted, the action of gate 28 prevents the data inserter 22 from taking another data segment from the local FIFO 21 until a slot goes unallocated at which time the process repeats.

Figure 5:
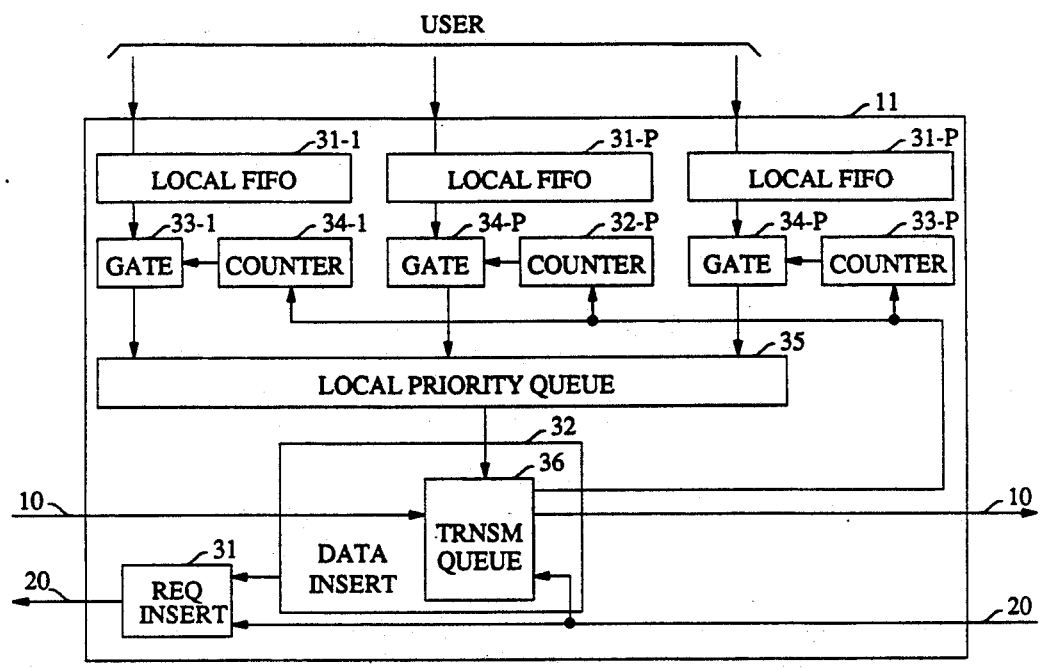
FIG. 5 is a coalesced version of the FIG. 4 embodiment.

A more compact implementation is shown in FIG. 5. Here the node has only one section, with one data inserter 32 and one request inserter 31 to manage data of all priority levels. However, a separate local FIFO Queue (31-1, 31-p, 31-P) for each priority is required, as well as separate permit counters 33 and gates 34. In addition, FIG. 5 includes a local priority queue 35 which is responsive to gates 34 and which applies its signal to data inserter 32. All local data segments with permits are stored in one queue 35 rather than in the separate local FIFOs 31. Data inserter 32 processes local data segments one-at-a-time from queue 35.

More specifically, whenever data inserter 32 observes an unallocated slot which is passed to downstream nodes, it creates $F_p$ permits for each priority level p. That is, it instructs each local FIFO 31-i to transfer to queue 35 up to $F_i$ segments, or packets of data. This is accomplished in FIG. 5 with counters 33, which are incremented by the corresponding bandwidth balancing factor, and decremented with each transfer of a segment from the corresponding local FIFO 33 to local queue 35.

When local queue 35 contains data and transmit queue 36 within data inserter 32 does not contain a local data segment taken from queue 35, then such a segment is inserted in the transmit queue behind the requests that arrived previously from bus 20. With each appearance of a non-busy slot on bus 10, local transmit queue 36 is served. When the local data segment (from local queue 35) reaches the top of the transmit queue 36, the local data segment is inserted into the non-busy slot of bus 10 and the busy bit of that slot is set. The process then repeats, with the local queue 35 entering a local data segment in the transmit queue. When local queue 35 becomes empty, data inserter 32 allows an unallocated slot to pass on bus 10 at the appropriate time and the entire process repeats with queue 35 being filled again from FIFO's 31. There are two approaches for determining the "appropriate time" when the unallocated slot is sent on bus 10. One is when local queue 35 is empty and transmit queue 36 is empty. Another is when local queue 35 is empty, and the requests within transmit queue 36 that accumulated since queue 35 became empty are satisfied.

When every node can determine the utilization of bus 10 due to traffic from other nodes of each priority level, then still another bandwidth balancing approach can be implemented in a DQDB network. In other words, priority of other nodes' traffic can be taken into account when a node throttles itself, but most advantageously this should be done symmetrically. I.e., taking account of the priority of the traffic in the reserved slots and traffic in the busy (occupied) slots. To that end, an additional measure of bus capacity can be considered, to wit, the capacity left over by parcels of priority p and greater, that capacity is $$U_{p+} = 1 - \sum_m \sum_{q \geq p} r_q(m). \tag{18}$$

If node n can observe priority levels of the reservation bits and of the data in busy slots, then it can measure $U_{p+}(n,t)$, which is the bus capacity not allocated by node n at time t to parcels of priority p or greater. Then, $$U_{p+}(n,t) = 1 - \sum_{q \geq p} B_q(n,t) - \sum_{q \geq p} R_q(n,t) - \sum_{q \geq p} S_q(n,t). \tag{20}$$

Bandwidth balancing is accomplished in this approach by asking the parcel of priority p to limit its throughput to some multiple $F_p$ of the spare bus capacity not used by parcels of equal or greater priority than p. Parcels with less demand than this limit, of course, do not need to limit themselves.

In accordance with this approach, the throughput of parcel p at node n is $$r_p(n) = \min[\rho_p(n), F_p \cdot U_{p+}] = \tag{21}$$

$$\min\left[\rho_p(n), F_p \cdot \left(1 - \sum_m \sum_{q \geq p} r_q(m)\right)\right]$$

or equivalently, $$\frac{r_p(n)}{F_p} = \min\left[\frac{\rho_p(n)}{F_p}, U_{p+}\right]. \tag{22}$$

This scheme is fair in the sense that all rate-controlled parcels within the network of the same priority level get the same bandwidth.

Allocation of bandwidth across the various priority levels is as follows: First, the entire bus capacity is bandwidth-balanced over the highest-priority parcels, as though the lower-priority parcels did not exist. Bandwidth balancing ensures that some bus capacity will be left unused by the highest-priority parcels. This unused bandwidth is then bandwidth-balanced over the second-highest-priority parcels. The bandwidth left over after the two highest priorities have been processed is then bandwidth-balanced over the third-highest-priority parcels, etc. It should be emphasized that with this approach, in contrast to the previously described approaches, the throughput attained by a parcel of a given priority is independent of the presence of lower-priority parcels anywhere in the network.

As with the earlier described approaches, equation 21 represents a set of almost linear equations (one for each node and priority level) in the unknowns $r_p(n)$. In the special case where all $N_p$ parcels of priority level p have heavy demand, the solution of these equations has a simple form $$r_p(n) = \frac{F_p}{\prod_{q \geq p}(1 + F_q \cdot N_q)}. \tag{23}$$

That means that if $F_1=F_2=F_3=4$ and there are one high-priority parcel, two medium-priority parcels, and one low-priority parcel, then the parcels' throughput rates are 4/5, 4/45, 4/45, and 4/225, and the unused bandwidth is 1/225 of the bus capacity.

For this "global, per-parcel" version of bandwidth balancing, the slot header must contain the busy bit, an indication of the priority level of the data segment in a busy slot, and an indication of the priority level of the requests. As for the priority of requests, the present slot assignment provides a multi-bit request field with one request bit for each priority level (see FIG. 1) which allows one to specify the priority level of requests by selecting a particular bit in the request field that is set. As for the priority information of the busy slots, we propose to use the two spare bits in the header of FIG. 1. By reading the busy priority bits and the request bits, each node can determine the priority level of all traffic on the bus.

In order to implement equation 21, node n should respond to arriving busy and request information in such a way that $$S_p(n,t) \leq F_p \cdot U_{p+}(n,t). \qquad (24)$$

Figure 6:
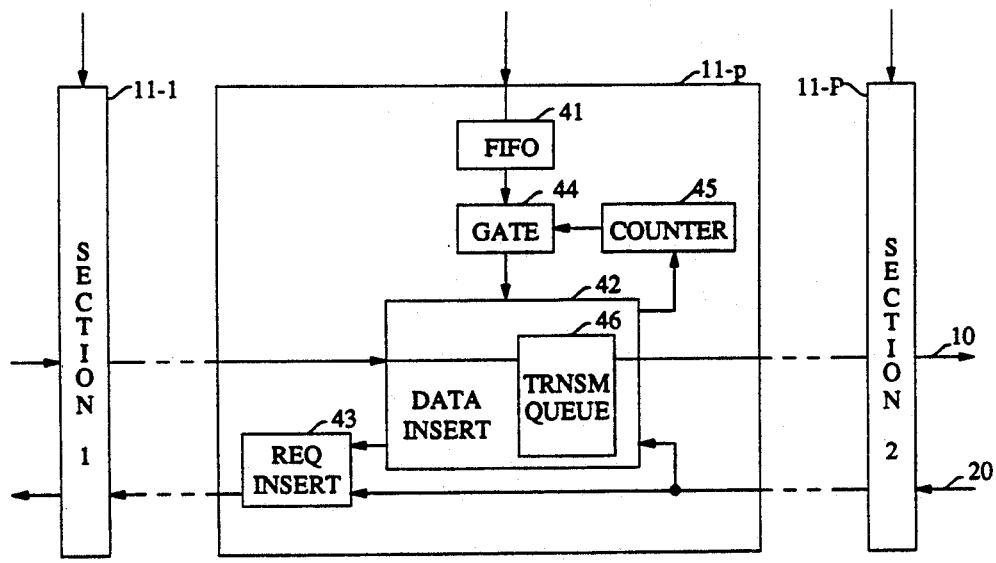
FIG. 6 presents a block diagram of a multi-priority node where all parcels are handled simultaneously with priority information on the data bus as well as on the reservation bus.

FIG. 6 presents one embodiment for carrying out the bandwidth balancing of equation 21. It comprises a plurality of sections in each node, where each section manages data of a different priority level. Thus, FIG. 6 depicts sections 11-1, 11-p, and 11-P, with section 11-1 being upstream from section 11-p and managing data of priority 1 (the lowest priority), and section 11-P being downstream of section 11-p and managing data of priority P (the highest priority).

While the layout of FIGS. 4 and 6 need not correspond to the actual physical implementation of a node 11, functionally it would be the same; and therefore, for the expository purposes of this disclosure it makes sense to describe the embodiment of FIG. 6. It is expected, however, that in an actual DQDB node, the sections will be coalesced into a more compact embodiment where signalling between the sections is done explicitly (rather than over the buses) and where all sections read a bus at the same place, before any of them has a chance to write.

In FIG. 6, each section has its own data inserter 42, request inserter 43, local FIFO 41, and permit counter 45 with gate 44. As in FIG. 4, data inserter 42 straddles bus 10. FIFO 41 receives data from users, and interposed between FIFO 41 and data inserter 42 is gate 44. Counter 45 controls gate 44 in consequence of signals provided to counter 45 by data inserter 42. Data inserter 42 also controls request inserter 43 which straddles bus 20.

Data inserter 42 contains a transmit queue 46 that can hold at most one local data segment of priority p. All requests of priority p or greater coming into node section p on bus 20 also become elements of transmit queue 46; requests of priority less than p do not join queue 46. When an empty slot appears on bus 10, transmit queue 46 is served. If the head entry is the local data segment, then the slot header is modified to indicate that the slot is now busy with data of priority p, and the local data segment is transmitted in that slot.

Within transmit queue 46, the requests are sorted by priority first and then by time of arrival. It still requires only two counters to implement this discipline. One counter counts requests of priority p that arrived at transmit queue 46 *before* the local data segment, plus *all* requests of priority greater than p regardless of arrival time. The other counter counts requests of priority p that arrived at queue 46 *after* the local data segment. (Recall that queue 46 holds no requests of priority less than p.)

Inequality 24 is implemented within the node's section that handles priority p as follows. Whenever data inserter 42 observes a slot that is not allocated to traffic of priority p or higher, it creates $F_p$ permits (i.e., it increments counter 45 by the bandwidth balancing factor). Unlike with the previously described approaches, there are two circumstances under which the data inserter 42 observes such a slot: (a) the slot arrives empty and finds transmit queue 46 inside data inserter 42 also empty, holding neither a local data segment nor requests from downstream nodes, and (b) the slot is already busy with a segment of priority less than p when the slot arrives at data inserter 42.

While counter 45 is positive, whenever a local data segment moves through gate 44 from FIFO 41 to transmit queue 46 in data inserter 42, counter 45 is decremented by one. Counter 45 is reset to zero whenever the node has no data of priority p to send.

A number of approaches (local, per node; local, per parcel; and global, per parcel) have been disclosed above that provide bandwidth balancing for multi-priority traffic. All of these methods converge gradually to a steady state over multiple round-trip-delay times. The three methods waste some bus bandwidth even in steady state. Advantageously, all of these methods are predictable. The steady-state throughput rates of the nodes are determined only by their offered loads and not by their relative bus locations, not by their relative start-up times. There is a trade-off between the convergence rate and the bus utilization that can be exercised through the bandwidth balancing factor. Moreover, these methods are fair in the sense that if each node has traffic of only one priority level and its parcel's demand is heavy, then nodes that are active at the same priority level get the same bandwidth in steady state.

The methods differ in the ways they allocate bus bandwidth across the various priority levels. In the "local, per-node" scheme, each node limits its throughput to the product of the bandwidth balancing factor and the unused bus capacity. In this approach, the bandwidth balancing factor varies according to the priority level at which the node is currently transmitting. Each node processes its own data segments in strict priority order; lower-priority segments are only served when no higher-priority segments are waiting. In other words, this scheme allocates bandwidth to all nodes in proportion to the bandwidth balancing factors of their current (highest) priority levels. The steady-state throughput of a higher-priority traffic parcel is not affected by the presence of lower-priority parcels within the same node, but it can be affected by the presence of lower-priority parcels at other nodes. In the two "per-parcel" approaches, all active parcels within a node receive some bandwidth. In the "local, per-parcel" approach, each traffic parcel limits its throughput to the product of the bandwidth balancing factor and the unused bus capacity. Of course, the bandwidth balancing factor depends on the priority level of the parcel. In other words, this approach allocates bandwidth to all parcels (regardless of which nodes they belong to) in proportion to their bandwidth balancing factors. Now the steady-state throughput of a traffic parcel is affected by the presence of every other parcel for that bus, including lower-priority parcels within the same node. In the "global, per-parcel" approach, each traffic parcel limits its throughput to the product of the bandwidth balancing factor and the bus capacity unused by parcels of equal or higher priority. In rough terms, this approach allocates bandwidth first to the higher-priority parcels, then allocates the leftovers to the lower-priority parcels. Lower-priority parcels have no effect on the steady-state throughputs of higher-priority parcels.

In all three methods, there is symmetry between the priority information needed concerning requests and that needed concerning busy slots, but this information needs to be different in the various schemes. The two "local" schemes are elegant—no priority information is transmitted on the buses, and consequently fewer counters are needed in the nodes. The "global" scheme has more communication and computation overhead. All three techniques can be implemented through modest changes in the DQDB slot format and protocol.

It should be mentioned that the two "local" approaches can be implemented with a streamlined "data inserter" (similar to the "global per-parcel" approach) that serves its "transmit queue" by satisfying: all received requests before the local data segment is served, regardless of the arrival times of the requests. (Since all the nodes in the network are following the bandwidth balancing discipline, the local data segment will eventually be served.) The advantage of this queuing discipline, as described above, is that it can be implemented with one counter rather than two.

The two-counter description was presented to emphasize the DQDB-based, two-counter implementation of the data inserter for the following reasons: (1) While both implementations have the same throughput performance under sustained overload, the delay performance under moderate load is frequently better with the two-counter implementation. (2) Many DQDB networks will have no significant fairness or priority problems (e.g., if the buses are short, or if the transmission rate is low, or if the application is point-to-point rather than multi-access). In these cases, one would want to disable bandwidth balancing (because it wastes some bandwidth) and use the pure DQDB protocol, which requires a two-counter data inserter. It is convenient to build one data inserter that can be used with or without bandwidth balancing, and this would have to be the two-counter version.

This brings up one final advantage of the "global" bandwidth balancing scheme over the "local" ones. If the "local" schemes are physically implemented by reducing the number of request bits to one per slot (shared by all priority levels), then whenever bandwidth balancing is disabled, the network has no priority mechanism. With the "global" scheme, each priority level has one request bit per slot, so the priority mechanism of pure DQDB can be retained when bandwidth balancing is disabled.

We claim:

1. A method for allocating transmission capacity in a network having a data bus that passes through network nodes 1 to N of said network in ascending order and a request bus that passes from network nodes N to 1 in descending order, where transmission capacity on said data bus is divided into slots and where each slot on said data bus contains a data field and a header field that includes a busy subfield and a request subfield, and where each node j, where j is an integer between 1 and N, accepts data with an associated priority level from a user port of said node, for transmission to a node K on said network where $j<k\leq N$, and controls the injection of said data into said data bus in accordance with a procedure comprising the steps of:

each node determining an effective spare capacity available to itself on said data bus based on the presence of request bits in the request subfield of slots on the request bus, and the busy bits in the request subfield of slots on the data bus; and each node throttling its rate of injecting of data into said data bus to a fraction of the effective spare capacity, where said fraction is related to the priority of the data presented to the node.

2. The method of claim 1 where the effective spare capacity is related neither to priority level of slots requested on said request bus nor to priority level of information in the busy slots on said data bus.

3. The method of claim 1 where the effective spare capacity is related to priority level of slots requested on said request bus and priority level of information in the busy slots on said data bus.

4. The method of claim 1 where the effective spare capacity is related to priority level of request bits on said request bus and priority level of busy bits in the busy slots on said data bus.

5. The method of claim 4 where the step of determining the effective spare capacity comprises the steps of:
determining the priority level of a node's parcel, p,
determining the rate of requests set, at priority level p or greater, in the request subfield of slots appearing at the request bus, and
determining the rate of busy indications, at priority p or greater, in the busy subfield of slots appearing at the data bus.

6. The method of claim 1 where the step of a node throttling its transmission rate comprises
selecting for transmission, from among parcels received by said node for transmission on said data bus, the parcel with the highest priority level, and
throttling the transmission rate of said highest priority parcel in accordance with a bandwidth balancing factor for said priority level.

7. The method of claim 1, further comprising a step of:
each node ordering by priority parcels received from said user port; and
applying said parcels to said step of throttling, one at a time, in order, in accordance with said ordering.

8. The method of claim 1, further comprising the steps of:
each node ascertaining the appearance of data accepted from said user port that comprises a plurality of parcels, and
each node separating said parcels for individual throttling of rate of injecting of data of said parcels into said data bus, Where
said step of each node throttling its rate of injecting of data comprises a plurality of throttling processes, with each process throttling the rate of injecting of data of a different one of the separated parcels to a fraction of the effective spare capacity, where the fraction employed in each of the plurality of throttling processes is related to the priority level of the parcel throttled.

9. The method of claim 8 where the effective spare capacity within each throttling process is related neither to priority level of slots requested on said request bus nor to priority level of information in the busy slots on said data bus.

10. The method of claim 8 where the effective spare capacity within each throttling process is related to priority level of slots requested on said request bus and to priority level of information in the busy slots on said data bus.

11. The method of claim 8 where the effective spare capacity within each throttling process is related to priority level of slots requested on said request bus that are greater than p, and to priority level of information in the busy slots on said data bus that are greater than p, where p is the priority level immediately below the priority level of the parcel throttled by said throttling process.

12. The method of claim 8 where said step of each node determining an effective spare capacity comprises a plurality of effective spare capacity determining steps, each developing an effective spare capacity for a parcel, in accordance with the parcel's priority level, with the effective spare capacity for a priority level p being employed in the throttling of the rate of injecting of data of the parcel having priority p.

13. A method for allocating transmission capacity in a slotted network having a data bus that passes through network nodes 1 to N of said network in ascending order and a request bus that passes from network nodes N to 1 in descending order, where transmission capacity on said data bus is divided into slots and where each slot on said data bus contains a data field and a header field that includes a busy subfield and a request subfield, and where each node j, where j is an integer between 1 and N, accepts data with an associated priority level from a user port for transmission to a node k on said network where $j<k\leq N$, which data comprises packets of information, and controls the injection of said data into said data bus in accordance with a procedure comprising the steps of:

accumulating requests from nodes m, where $m>j$, in a queue, when there is no local request from node j and data is available at node j, accumulating a local request in said queue, and returning to said step of accumulating request, in parallel with said accumulating of request, when the top request in said queue is a request from a node m and a non-busy slot appears at said node j on said data bus, satisfying that top request by passing said slot to succeeding nodes without alteration and removing the satisfied request from the queue, in parallel with said accumulating of requests, when the top request in said queue is said local request from node j and a non-busy slot appears at said data bus entering said node j, when a bandwidth balancing indication is set, satisfying said local request by populating said slot with a data packet, and when a bandwidth balancing indication is unset, passing said slot to succeeding nodes without alteration and setting said bandwidth balancing indication;

wherein said bandwidth balancing indication is unset in accordance with the priority level of said data.

14. The method of claim 13 where said bandwidth balancing indication is unset with every $M_p$ instances of satisfying said local request, where $M_p$ is related to the priority level p of said data.

15. The method of claim 14 where $M_p$ is greater than $M_j$, when priority p is higher than priority j.

16. The method of claim 13 where said step of accumulating requests places all requests arriving from nodes m, where $m>j$, ahead in said queue of said local request.

17. The method of claim 16 where said accumulating is accomplished by incrementing a counter, and said removing from queue is accomplished by decrementing a counter.

18. The method of claim 13 where said step of accumulating requests places in said queue all requests arriving from nodes m, where $m>j$, in order of arrival.

19. The method of claim 16 where, while there is a local request from node j, said accumulating of requests is accomplished by incrementing a first counter, and said removing from queue is accomplished by decrementing a second counter.

20. The method of claim 13 where the accumulating of said requests in order of arrival ignores requests of priority lower than the priority of the local request, and the requests that are not ignored are ordered by priority of the requests, with the ordering of the requests by priority predominating the ordering of requests by time of arrival.

21. A method for allocating transmission capacity in a slotted network having a data bus that passes through network nodes 1 to N of said network in ascending order and a request bus that passes from network nodes N to 1 in descending order, where transmission capacity on said data bus is divided into slots and where each slot on said data bus contains a data field and a header field that includes a busy subfield and a request subfield, and where each node j, where j is an integer between 1 and N, accepts data with an associated priority level from a user port for transmission to a node k on said network where $j<k\leq N$, which data comprises packets of information, and controls the injection of said data into said data bus in accordance with a procedure comprising the steps of:

determining the number of unsatisfied requests received from the request bus;

satisfying the unsatisfied requests by allowing empty slots to pass unpopulated; and populating less than all of the remaining empty slots with said data by passing an empty slot unpopulated for every selected number of empty slots that are populated, where the selected number is related to said associated priority level of said data.

22. The method of claim 21 where the number of unsatisfied requests, Q, corresponds to the number of request bits received by node j on said request bus, from downstream nodes $j+1$ to N, in excess of the number of empty slots passed through node j on said data bus to node $j+1$ that were left unpopulated by node j.

23. A method for allocating transmission capacity in a network having a data bus that passes through network nodes 1 to N of said network in ascending order and a request bus that passes from network nodes N to 1 in descending order, where transmission capacity on said data bus is divided into slots and where each slot on said data bus contains a data field and a header field that includes a busy subfield and a request subfield, and where each node j, where j is an integer between 1 and N, receives a parcel with an associated priority level from a user port of said node, for transmission to a node k on said network downstream from node j<k≦M, where said parcel is composed of data packets that are small enough to fit within the data fields of said slots, and where said node j controls the injection of said data packets into said data bus in accordance with a procedure comprising the steps of:

satisfying accumulated requests, injecting a data packet when an empty slot appears on the data bus and the accumulated requests are satisfied, for every given number of injected data packets, allowing an empty slot to pass unpopulated, and returning to the step of satisfying accumulated requests; where a measure of said accumulated requests is the number, Q, which equals the number of request bits received by node j on said request bus, from downstream nodes j+1 to N, minus the number of empty slots passed unpopulated through node j on said data bus to node j+1, in response to said request bits, from the most recent execution of said step of injecting a data packet;

said step of satisfying accumulated requests allows Q empty slots to pass unpopulated; and said given number is related to said priority level associated with said parcel received from said user port.

24. The method of claim 23 wherein said measure of accumulated requests is developed by incrementing a count whenever a request appears at the request bus, and by decrementing said count whenever an empty slot is passed unpopulated.

25. The method of claim 24 wherein said step of allowing an empty slot to pass unpopulated every given number of injected data packets is effected by creating a slot request with every given number of injected data packets, with said created request appearing to said node j as a request from nodes downstream from said node j.

* * * * *